April 8, 1969  D. R. HERRIOTT ET AL  3,437,954
OPTICAL DELAY LINE DEVICES
Filed March 31, 1965  Sheet 1 of 3
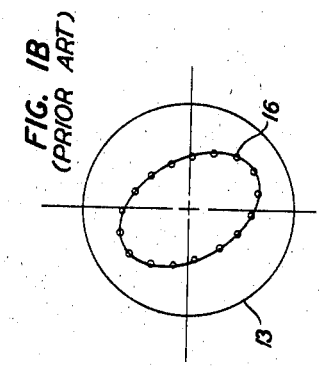
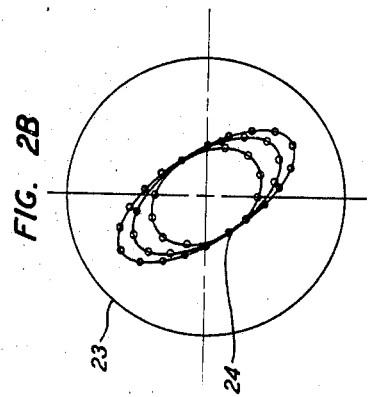
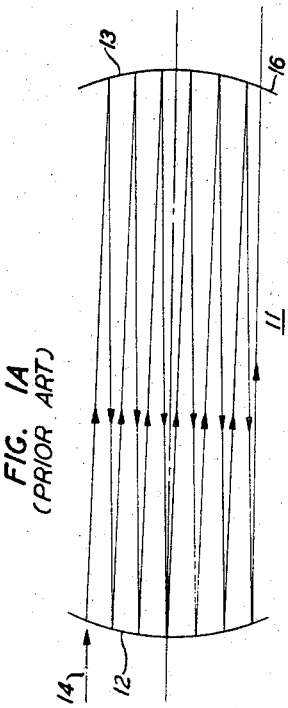
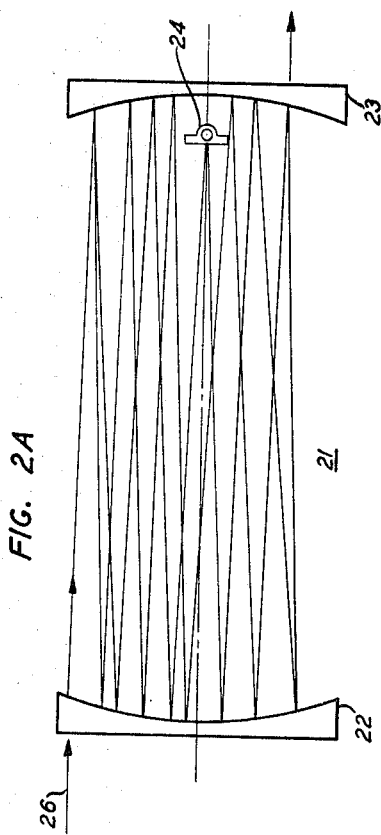
INVENTORS D. R. HERRIOTT
H. J. SCHULTE JR.
BY
ATTORNEY

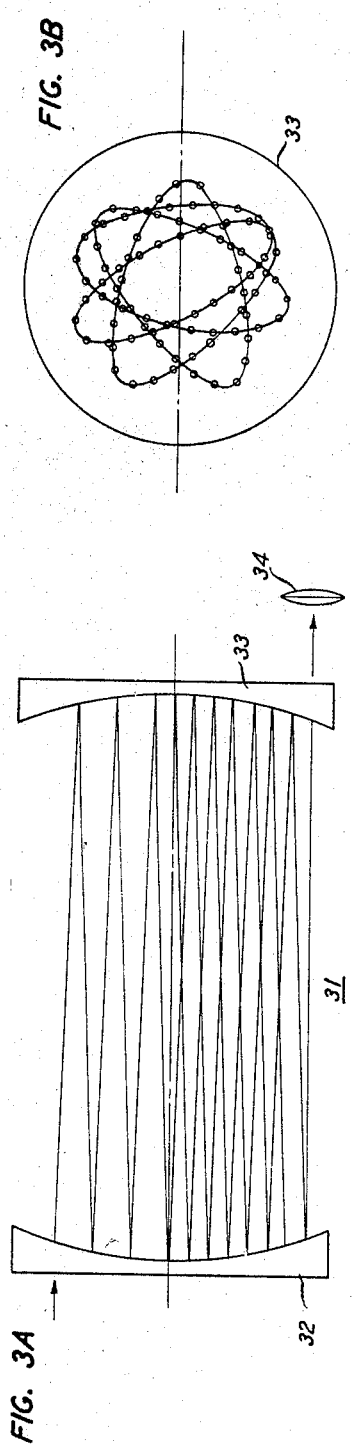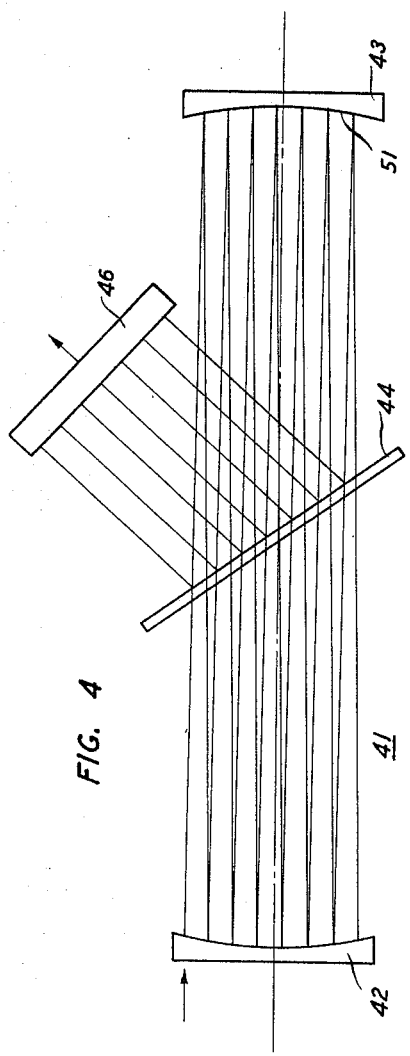

United States Patent Office 3,437,954
Patented Apr. 8, 1969

3,437,954
OPTICAL DELAY LINE DEVICES
Donald R. Herriott, Morris Township, Morris County, and Harry J. Schulte, Jr., Berkeley Heights, N.J., assignors to Bell Telephone Laboratories, Incorporated, New York, N.Y., a corporation of New York
Filed Mar. 31, 1965, Ser. No. 444,307
Int. Cl. H01s 3/00; H03f 1/00
U.S. Cl. 331—94.5                               10 Claims

ABSTRACT OF THE DISCLOSURE

An optical delay line has a pair of curved mirrors forming a resonator into which an off-axis beam is introduced to trace a plurality of off-axis paths between the two mirrors. Perturbing means within the resonator interrupts the beam and directs it along new paths to produce greatly increased delay.

---

This invention relates to optical maser devices and, more particularly, to such devices which utilize spherical mirrors to form a cavity resonator.

In general, optical masers, such as, for example, the gaseous type disclosed in the copending U.S. patent application, Ser. No. 277,651, of A. Javan, can be made to produce increased gain by increasing the length thereof. The Q of the resonator formed by reflecting surfaces or mirrors increases with increased lengths until the diffraction losses become comparable to the reflection losses. Beyond this point, an increase in path length results in an actual degradation of performance.

In the copending U.S. patent application, Ser. No. 309,026 of D. R. Herriott, H. W. Kogelnik, and R. Kompfner, there is shown an optical maser arrangement in which a system of off-axis beam paths is utilized to produce long optical paths folded between the spherical mirrors. The light to be amplified, delayed, or otherwise operated upon is injected through one mirror at a proper angle and position and is reflected back and forth between the two mirrors in a manner such that an elliptical or circular pattern of reflection points is traced out on the mirrors. After a large number of reflections the beam leaves the cavity. The shape and location of the ellipses, as well as the spacing of the reflecting points along the ellipses, are determined by the radius of curvature of the two mirrors, their spacing and the angle and position of injection of the light ray into the cavity. If the injected ray has a wavefront radius and spot size that corresponds closely to that of the resonant modes between the mirrors, the diameter of the ray will not grow even after a large number of reflections, and the diffraction losses are small. With such an arrangement, greatly increased path length and increased gain or delay are achieved in a compact structure.

While the structure disclosed in the aforementioned Herriott et al. application achieves the desired end of an increased path length and increased gain, the total path length is limited by the mirror spacing and the number of spots of finite size that can be spaced around the ellipse within the mirror diameter without overlap. As a consequence, where that arrangement is utilized as a delay line, the maximum available delay is also limited.

In general, an optical delay line is useful in a wide variety of applications, such as, for example, a delay memory system, as a transversal filter, and as a device for making low loss measurements. In such arrangements, in particular applications thereof the delay available with the aforementioned Herriott et al. arrangement may not be sufficient. Accordingly, it is an object of the present invention to produce a large delay of optical energy within a compact structure that is readily adaptable to a wide variety of uses.

In low loss measurements, e.g., mirror reflectance, it is often desirable to have a large number of reflections, without regard to delays. The Herriott et al. device being limited as to the number of reflections, may not produce a sufficient number for such measurements. Accordingly, it is another object of the invention to produce a large number of noninterfering reflections in a cavity resonator.

In an illustrative embodiment of the invention, an optical cavity resonator is formed by a pair of spherical mirrors. Means are provided for injecting a light beam into the resonator at an angle to the axis thereof in accordance with the principles set forth in the aforementioned Herriott et al. application. A beam so injected is reflected back and forth between the two mirrors and the points of reflection on the face of each mirror trace out an ellipse.

Positioned adjacent the reflecting face of one of the mirrors is a small, adjustable mirror, preferably, but not necessarily flat, which intercepts the light beam before it has completely traced out an ellipse, preferably just prior to its reflection at the last spot on the ellipse. The small mirror, hereinafter referred to as a perturber, is adjusted so that the light beam impinges on it at an angle different from the angle of impingement on the spherical mirror. As a consequence, the beam is reflected into an entirely new path and commences to trace a new ellipse on the mirrors which may differ in size, orientation, or both from the first ellipse. As a consequence, the perturbing mirror causes a large number of ellipses to be traced, i.e., causes the folded beam path to be greatly increased in length, resulting in a large delay.

In another illustrative embodiment of the invention, one or both of the mirrors forming the resonator is made slightly aspherical or astigmatic. With such an arrangement, the beam traces a Lissajous pattern on the face of each mirror, which may be either running or re-entrant.

It is a feature of the present invention that an optical cavity resonator has a nonuniform reflection pattern i.e., a deviation in reflection pattern from that obtainable in a resonator with spherical mirrors.

It is another feature of the invention in one embodiment thereof that the nonuniformity in the reflection pattern is produced by a small perturbing mirror.

It is still another feature of the invention in a second illustrative embodiment thereof that the nonuniformity in the reflection pattern is produced by an aberration in at least one of the mirrors forming the cavity resonator.

These and other features of the present invention will be readily apparent from the following detailed description, taken in conjunction with the accompanying drawings, in which:

FIGS. 1A and 1B are diagrammatic representations of prior are devices;

FIGS. 2A and 2B are diagrammatic representations of a first illustrative embodiment of the invention;

FIGS. 3A and 3B are diagrammatic representations of a second illustrative embodiment of the invention;

FIG. 4 is a diagrammatic representation of an embodiment utilizing the principles of the invention;

Figure 5:
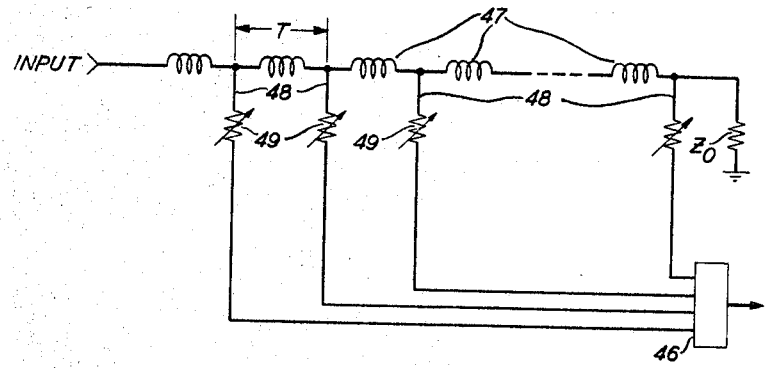
FIG. 5 is a schematic diagram of the electrical equivalent of the arrangement of FIG. 4.

Turning now to the drawings there is shown in FIG. 1A a cavity resonator 11 formed by a pair of nonconfocally spaced spherical mirrors 12 and 13, as used in the aforementioned Herriott et al. application. A light beam 14, introduced into the resonator in the manner disclosed in that application, is reflected back and forth between the mirrors a number of times before exiting through mirror 13 at point 16. The points of reflection on each of the mirrors 12 and 13 define an ellipse, as shown for mirror 13 in FIG. 1B. Where the light beam is modulated before entering the resonator, it is generally necessary to extract the beam before it becomes reentrant inasmuch as interference effects which degrade the signal occur when the beam retraces itself. As a consequence, the total delay available is governed by the number of nonoverlapping reflections that can occur in tracing the ellipse.

In FIG. 2A there is shown an optical cavity resonator 21 embodying the principles of the present invention which accomplishes the same ends as the resonator of FIG. 1A, but permits materially greater delays.

Resonator 21 comprises first and second spherical mirrors 22 and 23 which are preferably spaced at a distance greater than the confocal distance. Within the resonator 21 and closely adjacent the face of mirror 23 is a small adjustable perturbing mirror 24 which is offset from the axis of the resonator. Mirror 24 may be mounted in any one of a number of ways to give adjustment about one or more axes.

A light beam 26 from a source, not shown, when introduced into resonator 21 through an aperture or partially transmissive portion of mirror 22, traces out an ellipse on each of the mirrors 22 and 23 as discussed in connection with FIGS. 1A and 1B.

Mirror 24 is so placed and beam 26 is so introduced that the beam impinges on mirror 24 just prior to completion of the first ellipse. Mirror 24 is adjusted so that the angles of incidence and reflection of the beam are different than they would have been if the beam had impinged on mirror 23. As a result, the beam commences to trace a new ellipse on each of the mirrors 22 and 23, and again strikes mirror 24 near the completion of the second ellipse, whereupon it starts on a new path. In FIG. 2B is shown a representative pattern of ellipse as traced on mirror 23. The direction that the perturber deviates the beam determines the orientation and shape of the new ellipses. The new ellipses can be made smaller or larger than the original ellipse. In addition, where desired, the beam can be made reentrant after tracing a number of ellipses, which is useful in optical storage systems where amplification of the beam occurs somewhere in the system path.

It can readily be appreciated that unusually long delays are possible with the arrangement of FIGS. 2A and 2B with a minimum of diffraction losses because of the periodic focusing caused by the spherical mirrors.

In the arrangement of FIGS. 2A and 2B, a nonuniform reflection pattern for the resonator was obtained by means of a perturbing mirror. It is also possible to obtain nonuniformity, by which is meant a deviation in reflection pattern from that obtainable in a resonator with spherical mirrors, by means of an abberation in one or both of the mirrors forming the resonator. This aberration may be achieved by making one or both mirrors astigmatic through the addition of a cylindrical component. The mirrors may be made astigmatic by bending them slightly in their mounts. Alternatively, the mirror blank may be slightly bent during the grinding and polishing of the spherical surface, and then mounted with the bending stress removed. The surface quality must be a very small fraction of a wavelength to maintain a small spot size and to obtain the desired pattern of spots. A surface of $\lambda/4$, where $\lambda$ is the light beam wavelength, in a diameter of twenty times that of an individual spot has been found to be satisfactory.

In FIG. 3A there is shown a cavity resonator 31 having a pair of mirrors 32 and 33 which have a nonuniform reflection pattern due to a cylindrical component in their otherwise spherical configuration. This cylindrical component causes each mirror to have more than one focal length. It can be shown mathematically that the reflection pattern on the mirrors becomes a Lissajous pattern, an example of which is shown in FIG. 2B. The pattern itself depends upon the degree of astigmatism present in the mirror, and can be made reentrant or "running." The pattern shown in FIG. 3B requires a cylindrical component of only a few fringes. The mirrors can have a principal radius near the confocal case so that there are only slightly more than two reflection spots per cycle of motion in each coordinate of a rectangular coordinate system, or the mirrors can have radii quite far from confocal in which case the reflection spots are very closely spaced along the Lissajous path.

In the foregoing embodiments, where a large exit aperture through one of the mirrors is used, or where the mirror is partially transmissive in the exit region, it is necessary to differentiate the desired exit beam from other beams in the system. This can be done, for example, by placing a lens at the exit point, such as lens 34 in FIG. 3A so that the far field pattern lies in the focal plane of the lens. An aperture placed at this spot would then pass only the desired exit beam. Crosstalk can be further minimized in the nonconfocal case because the spot size varies, going through two minima per cycle in each coordinate. As a consequence, a spot smaller than the natural spot in the resonator can be injected, and the beam abstracted where the spot size is again small. It is also possible to have multiple storage paths in the resonator, as by introducing a plurality of beams at different angles through the entrance aperture, and differentiate between the beams at the exit aperture by their exit angles, which will be different.

The cavity resonators discussed in the foregoing which embody the principles of the present invention have a large number of uses. One such use is as a transversal filter or tapped delay line, as shown in FIG. 4. The arrangement of FIG. 4 comprises a cavity resonator 41 having a pair of aspherical mirrors 42 and 43. Within resonator 41 is an adjustable window 44. When window 44 is adjusted so that it is at the Brewster angle, the light rays pass through without reflection. As the window is moved away from the Brewster angle, energy from each ray is reflected out of the resonator, the greater the deviation from the Brewster angle, the more energy reflected out. As a consequence, a plurality of rays is abstracted from the resonator, each ray being taken from a different stage of the over-all delay. These rays are directed to a suitable detector or summing device 46 which may take any one of a number of forms known in the art. In the arrangement of FIG. 4, the resonator of FIGS. 2A and 2B may also be used.

The electrical equivalent of the arrangement of FIG. 4 is shown in FIG. 5. The tapped delay line of FIG. 5 comprises a plurality of delay sections 47, each of a length T which is equal to twice the distance between the mirrors 42 and 43 in the resonator 41 of FIG. 4. A plurality of taps 48 lead from the sections of the line to a summing device 46. Each tap has a variable attenuator 49, which represents the window 44, and governs the amount of energy reaching the device 46 just as the angle of window 44 governs the energy reaching device 46 in FIG. 4. The end of the delay line is terminated in absorber $Z_0$ which, in FIG. 4, may take the form of a small absorber 51 on, for example, mirror 43.

It is obvious that a tapped delay line as shown in FIG. 5 can have a variety of uses. In a like manner, the arrangement of FIG. 4 is susceptible of a number of uses, such as, for example, a linear filter with adjustable loss, a time domain equalizer, or a band pass or band reject filter. In any of the above applications, the maximum available delay is of prime importance. With mirrors of ten meter spherical radius spaced three meters apart, time delays of ten microseconds have been achieved, with equivalent path lengths of the order of three thousand meters and power losses of the order of 1 decibel or less per microsecond.

Instead of the window arrangement shown in FIG. 4, one of the mirrors 42 or 43 may be made partially transmissive throughout to achieve multiple outputs. In this case, an output ray will occur at each reflection point.

Figure 6A:
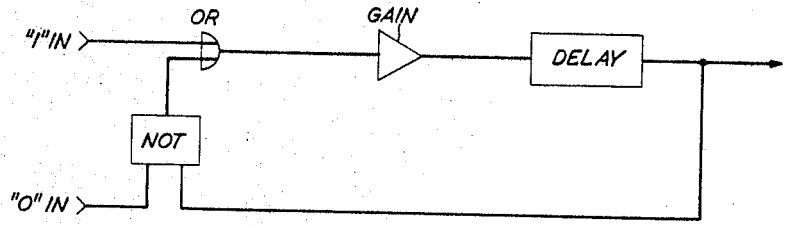
FIGS. 6A and 6B are schematic diagrams of applications of the device of the present invention.
Figure 6B:
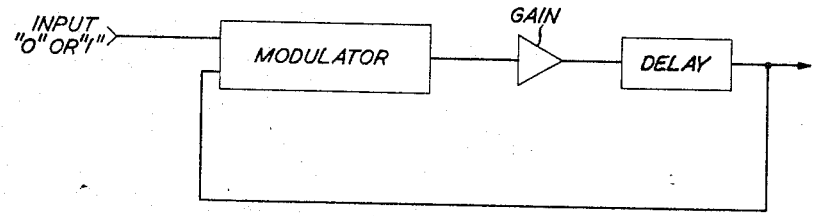

FIGS. 6A and 6B are schematic illustrations of optical digital delay line memory circuits utilizing the delay devices of the present invention. The circuit of FIG. 6A depicts an amplitude modulated system while that of 6B shows a phase or polarization modulation system. The arrangements of FIGS. 6A and 6B can be either all optical or a combination of optical and electrical circuitry. With electrical circuitry in the system, optic to electric to optic transduction is, of course, required.

In addition to the foregoing uses, the optical delay arrangement can be used in making low loss measurements. In cases where small optical effects, such as loss, index of refraction, and polarization are to be measured, the number of reflections is generally more important than the delay. As a consequence, the mirror spacing may be reduced to a few centimeters instead of meters. If, for example, it is desired to measure the loss per reflection in the resonator, it can be shown that accuracy of something less than 10% error is readily obtainable.

While the foregoing has dealt with optical resonators as delay lines, it is clear that the resonators of the present invention can be used in an amplifier or oscillator arrangement of the type shown in the aforementioned Herriott et al. application.

In the foregoing embodiments, the objects of the invention were achieved by means of nonuniformities in the reflection patterns of the resonator, the nonuniformities being created by perturbers or aberrations in the reflecting mirrors. Various other ways of introducing nonuniformities into the reflection pattern may occur to workers in the art without departing from the spirit and scope of the present invention.

What is claimed is:

1. A resonator for use at optical wavelengths comprising first and second mirrors defining the ends of said resonator, means for introducing a beam of light into said resonator to be multiply reflected by said mirrors in a set of noninterfering off-axis paths, said mirrors being curved to produce periodic focusing of the beam, and means for producing a nonuniform reflection pattern in said resonator to cause said beam to follow different sets of paths in said resonator.

2. A resonator as claimed in claim 1 wherein said last-mentioned means comprises a perturbing mirror in said resonator.

3. A resonator as claimed in claim 1 wherein said last-mentioned means comprises a cylindrical component in the reflective surface of at least one of said mirrors.

4. An optical delay line comprising first and second spherical mirrors forming a cavity resonator, means for introducing a beam of light into said resonator at an angle to the axis thereof and spaced from the axis, said light beam being multiply reflected by said mirrors into a plurality of off-axis paths within said resonator, means within said resonator for periodically interrupting the path of said beam and directing it along a plurality of different optical paths within said resonator and means for abstracting at least one light beam from said resonator.

5. An optical delay line as claimed in claim 4 wherein said abstracting means comprises a window member between said mirrors disposed at an angle to the axis of said resonator.

6. An optical delay line comprising first and second mirrors forming a cavity resonator, means for introducing a beam of light into said resonator at an angle to the axis thereof and spaced from the axis, said light beam being multiply reflected by said mirrors along a plurality of paths within said resonator, said mirrors being curved to produce periodic focusing of the beam, means for causing said beam to trace a Lissajous pattern of reflection points on said mirrors comprising an aspherical reflecting surface on at least one of said mirrors, and means for abstracting light energy from said resonator.

7. An optical delay line as claimed in claim 6 wherein said abstracting means comprises a window member between said mirrors disposed at an angle to the axis of said resonator.

8. A transversal filter comprising first and second mirrors forming a cavity resonator, means for introducing a beam of light into said resonator at an angle to the axis thereof and spaced from the axis, said light beam being multiply reflected by said mirrors into a plurality of noninterfering off-axis paths, said mirrors being curved to produce periodic focusing of the beam, means for producing a nonuniform reflection pattern in said resonator, means for abstracting a plurailty of light energy outputs from different ones of said off-axis paths, means for utilizing the energy so abstracted, and light absorbing means on the surface of one of said mirrors at a point corresponding to a reflection point on said mirror.

9. A transversal filter as claimed in claim 8 wherein said nonuniform reflection pattern producing means comprises a perturbing mirror in said resonator.

10. A transversal filter as claimed in claim 8 wherein said nonuniform reflection pattern producing means comprises a cylindrical component in the reflective surface of at least one of said mirrors.

References Cited

UNITED STATES PATENTS

| 2,907,958 | 10/1959 | Skaggs. |
| 3,174,044 | 3/1965 | Tien _____ 250—199 |
| 3,316,501 | 4/1967 | Collins et al. _____ 331—94.5 |

JEWELL H. PEDERSEN, *Primary Examiner.*

RONALD L. WIBERT, *Assistant Examiner.*

U.C. Cl. X.R.

330—4.3